(12) United States Patent
Rogers et al.

(10) Patent No.: US 8,693,286 B1
(45) Date of Patent: Apr. 8, 2014

(54) POSITION MEASUREMENT FOR COLLISION REPAIR SYSTEMS

(75) Inventors: Steve W. Rogers, Conway, AR (US);
Darwin Y. Chen, Conway, AR (US);
Eric F. Bryan, Conway, AR (US);
Adam C. Brown, Maumelle, AR (US)

(73) Assignee: Snap-On Incorporated, Kenosha, WI (US)

( * ) Notice: Subject to any disclaimer, the term of this patent is extended or adjusted under 35 U.S.C. 154(b) by 713 days.

(21) Appl. No.: 12/906,638

(22) Filed: Oct. 18, 2010

Related U.S. Application Data

(60) Provisional application No. 61/252,429, filed on Oct. 16, 2009.

(51) Int. Cl.
*G01S 15/00* (2006.01)
(52) U.S. Cl.
USPC .......................................................... 367/100
(58) Field of Classification Search
USPC ................................................. 367/141–190
See application file for complete search history.

(56) References Cited

U.S. PATENT DOCUMENTS 5,161,125 A * 11/1992 Maccabee ........................ 367/99
6,331,964 B1 * 12/2001 Barone ........................... 367/128

* cited by examiner

*Primary Examiner* — Luke Ratcliffe
(74) *Attorney, Agent, or Firm* — McDermott Will & Emery LLP

(57) ABSTRACT

A position measurement apparatus and methodology is provided. Embodiments include a probe including an acoustic signal source, an optical signal source, and a probe processor for driving the signal sources such that the signals of the acoustic source and the optical source have a known temporal relationship to each other. A receiver receives the optical and acoustic signals, and a processor communicates with and controls the probe and the receiver, and processes data from the receiver. The acoustic signal source is a sinusoidally varying acoustic energy source, and the acoustic signal received by the receiver comprises a sinusoidal signal. The processor correlates the received sinusoidal signal to a mathematical reference sinusoidal signal, and determines a specific cycle and a specific phase as a time of flight measurement point based on the correlation.

16 Claims, 8 Drawing Sheets

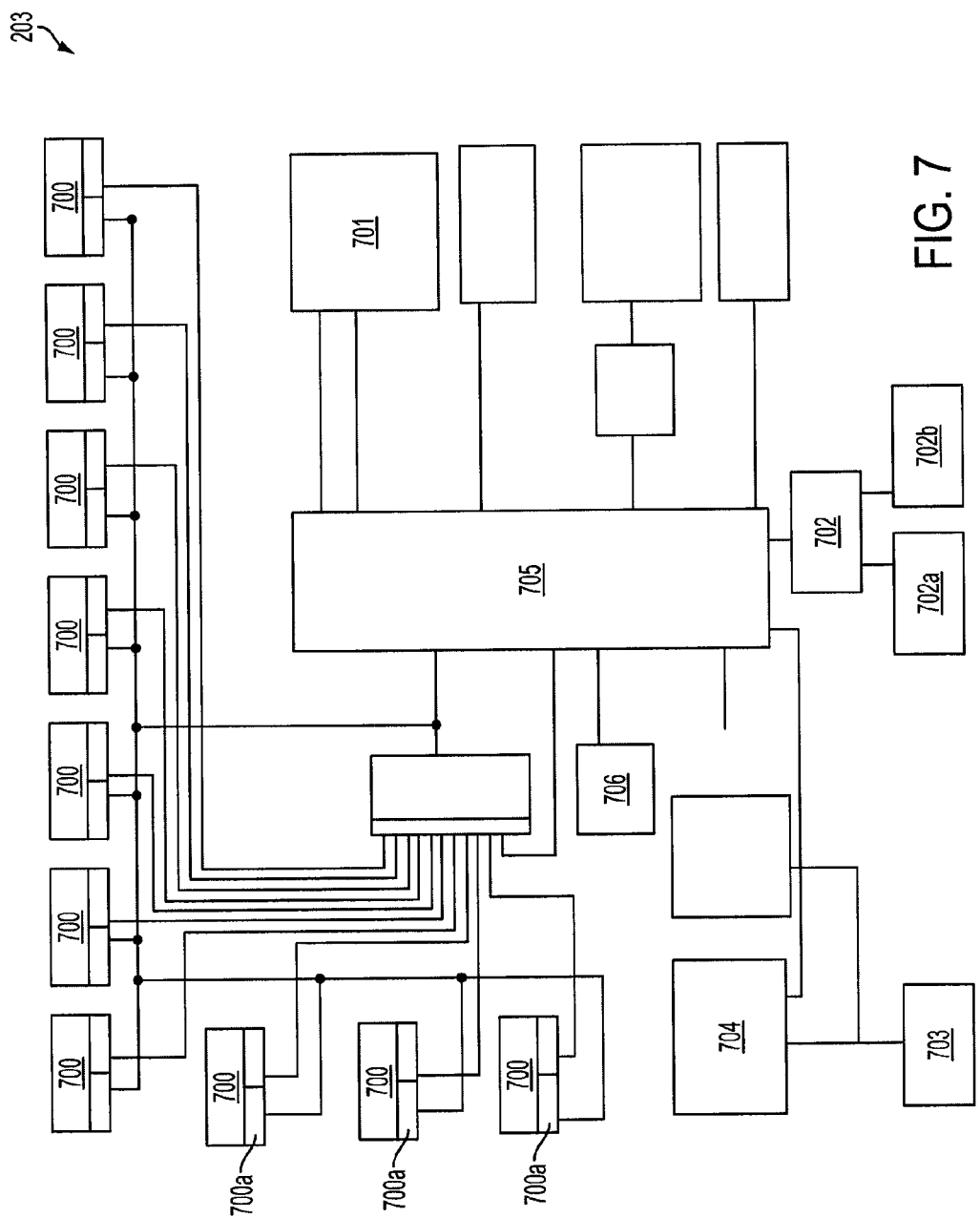

POSITION MEASUREMENT FOR COLLISION REPAIR SYSTEMS

RELATED APPLICATION

The present invention claims priority of provisional patent application No. 61/252,429 filed Oct. 16, 2009, the contents of which are incorporated herein in their entirety.

TECHNICAL FIELD

The present subject matter relates to position measurement systems for automotive collision repair. The present disclosure has particular applicability to under car position measurement systems using acoustic and/or optical sensors.

BACKGROUND

A current conventional under car measurement system for collision repair, such as the Blackhawk Shark system, has been in the marketplace for many years. It can monitor the locations of up to 12 under car measurement points with adequate accuracy and repeatability for collision repair. The system consists of a console, a long measuring beam housing 48 microphones, a set of proprietary adaptors, and up to 12 wired probes for attachment to vehicle body and frame points to be measured.

The probes are attached to the points of interests on the vehicle via combinations of adaptors. Each probe has two spark discharging point sources that can emit acoustic energy. The measuring beam, which is 3.6 meters in length, houses 48 microphones at calibrated positions that are tuned in monitoring acoustic energy at a preset ultrasonic frequency, placed longitudinally underneath the vehicle. The beam activates specific probes to emit acoustic energy, and when the acoustic energy reaches the microphone network, it logs the time of flight of the energy. The data is then sent to the console PC for processing, using an algorithm to determine the 3 dimensional location of each spark point source. Knowing the distance between the spark point sources and the dimensions of the adaptors employed, the system can extrapolate the three dimensional location of the point of interest at which the probe is attached. Four probes are assigned to undamaged points on the vehicle to set up the universal coordinate system that is used in recording all measured points. The XYZ coordinates of the measured point are then compared with the data of such points under the factory conditions in the database. The absolute values and XYZ deviations are then presented in the Graphic User Interface for a technicians' review. The console provides accommodation for adaptors, the monitor, PC, the printer, and probes. The application software and vehicle database is loaded in the PC.

In such conventional systems, the acoustic energy is produced by creating a high voltage spark between two electrodes on the probe. This energy is embodied as a single short, 50 uS pulse of acoustic energy composed of a wide band of sound frequencies. The acoustic energy travels at the speed of sound, or approximately 344 m/sec at sea level. The time of flight is the measure of the time interval for the acoustic energy to propagate in the air between the probe and a microphone positioned on the plane of the beam. The time of flight measured by each microphone is directly related to the straight line distance between the energy source (spark) and the microphone.

The measurement beam embeds 48 microphones, 24 each on opposing sides. The system uses at least six microphones for calculation of the speed of acoustic energy and the position or three dimensional coordinates of the source of the energy. The calculation of the sound speed is based on three microphones that are located in a straight line and at known positions relative to each other.

Assuming that three microphones (M1, M2 and M3), shown in FIG. 1A, are at equal distances (a) one from another and in a straight line and an energy source at position (S), the times of flight for energy to travel from S to each microphone are t1, t2 and t3 at a velocity of v.

The normal distance (x) from the beam to the source (S) can be defined in terms of each microphone by the following set of equations:

$$x = \sqrt{d1^2 - (2*a - y)^2} \tag{1}$$

$$x = \sqrt{d2^2 - (a - y)^2} \tag{2}$$

$$x = \sqrt{d3^2 - y^2} \tag{3}$$

Furthermore the distance from the source S to each microphone can be defined in terms of the measured time of flight to each microphone;

$$d1 = v*t1 \tag{4}$$

$$d2 = v*t2 \tag{5}$$

$$d3 = v*t3 \tag{6}$$

Substituting for d in equations 1, 2 and 3 and then solving for v, we arrive at the following:

$$v = \sqrt{2*a^2 / (t1^2 - 2*t2^2 + t3^2)} \tag{7}$$

Using v and the three measured times of flight, we can now solve for each distance in equations 4, 5 and 6.

To calculate the position of the source S(x,y,z), as illustrated in FIG. 1B, we now use the times of flight from three different microphones that are NOT on the same line.

From the triangle ΔSOx we have $$\cos \theta = x/d1 \tag{8}$$

From the triangle ΔSOa we have $$\cos \theta = (d1^2 - d2^2 + a^2)/2*a*d1 \tag{9}$$

Set equation (8) equal to equation (9) and solve for x $$x = (d1^2 - d2^2 + a^2)/2*a \tag{10}$$

Now set equation (8) equal to equation (9) and solve for z $$z = (d1^2 - d3^2 + b^2)/2*b \tag{11}$$

From triangle ΔSFO the y can calculated by $$y = \sqrt{d1^2 - x^2 - z^2} \tag{12}$$

While the conventional system has been adequate for many years, there is a desire to develop a new system that improves customer experience, accuracy, field maintenance and cost.

Typical conventional systems utilize a measuring beam of, for example, 3.6 meters in length and 60 lbs in weight that requires two technicians to handle. A beam height of 180 mm also makes it sometimes challenging to setup for low-profile vehicles. An overall lighter, shorter, and lower-profiled beam is desirable to simplify the setup process and also improve efficiency.

In the conventional system, the precise location of each microphone must be known in order to calculate the source position. More specifically, the precise point at which the acoustic energy is detected within the microphone must be known. The microphones are assembled within and along the monolithic 3.6 meter beam. In manufacturing, a complex factory calibration system is used to accurately locate the position at which the acoustic energy is received within each microphone. Once the beam has been calibrated, a microphone or other critical electronic component in the beam must not be replaced; otherwise the beam must be once again calibrated on the factory calibration system. This limits the possibility of servicing of the beam once placed at a customer's location.

The working environment of collision repair shops is generally noisy as frame straightening, metal forming and cutting processes require extensive usage of high power hydraulic and pneumatic tools. Some of these tools along with leaking air pipes may emit acoustic energy at frequencies that disrupt normal operation of the prior art systems. Air turbulence and dramatic temperature gradient changes may also alter the quality of the air media thus interfering with the propagation of the acoustic energy from the probes.

The time of flight of the acoustic energy is affected by many characteristics of the environment such as air temperature, air pressure (or altitude) and air velocity or air currents. In addition, acoustic energy can be refracted or bent by propagating across boundaries between areas of different air density sometimes caused by local variances of these characteristics. Refraction forces the energy to travel in a curves or non-straight lines making the path longer between the source and one or more of the microphones. Refraction can cause minor to significant errors in the measured time of flight and thus the calculated position of the source.

In conventional systems, strong acoustic energy or noise from other sources, i.e., impact drills, air powered chisels, and leaking air pipes, in the surrounding area can superimpose with the acoustic energy from the probe source making it difficult to detect the short burst of energy from the spark. Noise can cause the time of flight of the source energy pulse to be measured incorrectly or missed completely.

The vehicle under repair is normally parked on the frame straightening bench, and anchored to the bench by pinchweld clamps and/or multiple steel chains or cables. Often it is also hooked to the hydraulic pulling towers to be straightened. These clamps, chains, and cables may block or alter the path of acoustic energy from probes' straight line propagation.

Over the past 15 years, passenger vehicles and the vehicle repair industry have evolved to present new requirements and challenges to a good automotive repair instrumentation system. Some extended bed pickup trucks now can be 6 meters or longer. Upper body structures of the vehicles are more and more of repair interests. Both opportunities also introduce more points of interests to be surveyed. An improved system with multiple beam expansion capability, upper body measuring capability, and the capability to support a larger number of intelligent, wireless probes is required.

In typical conventional systems, each probe is connected to the beam by a cable capable of carrying a high voltage signal to the probe electrodes for the purpose of producing a spark. This configuration has several drawbacks. A spark has a significant electro-magnetic output in addition to the acoustic output. This additional energy is subject to regulations regarding unwanted radio emissions, i.e., UL compliance. A spark requires substantial power and so requires a large power source and therefore almost certainly requires a cable. The cable connection to the beam presents inconvenience and potential hazards as cables had been reported to be accidentally cut during operations. A spark may vary its acoustic characteristics depending upon temperature, humidity, and barometric pressure. Most significant is that the voltage required for the spark to occur between the electrodes varies on these characteristics and may occur earlier or later than expected.

Further, in typical conventional systems, the measuring beam employs two identical data acquisition modules that each controls half of the microphones in the beam and up to 6 probes that are connected to its side of the beam. If the probe locates close to the mid section of the beam, the group of nearest six microphones may not be controlled by a single data acquisition module. Thus the processing of the acoustic energy from the probe must be performed by some microphones further away from the probe, compromising the accuracy of the measurement.

SUMMARY

The teachings herein provide a position measurement system having improved performance and convenience.

According to the present disclosure, the foregoing and other advantages are achieved in part by a position measurement apparatus comprising a probe including an acoustic signal source, an optical signal source, and a probe processor for driving the signal sources such that the signals of the acoustic source and the optical source have a known temporal relationship to each other; a receiver for receiving the optical and acoustic signals; and a processor for communicating with and controlling the probe and the receiver, and processing data from the receiver. The acoustic signal source is a sinusoidally varying acoustic energy source, and the acoustic signal received by the receiver comprises a sinusoidal signal. The processor is for correlating the received sinusoidal signal to a mathematical reference sinusoidal signal, and for determining a specific cycle and a specific phase as a time of flight measurement point based on the correlation.

In accord with another aspect of the disclosure, a method for position measuring comprises: providing a probe including an acoustic signal source, an optical signal source, and a probe processor for driving the signal sources such that the signals of the acoustic source and the optical source have a known temporal relationship to each other; and a receiver for receiving the optical and acoustic signals; wherein the acoustic signal source is a sinusoidally varying acoustic energy source, and the acoustic signal received by the receiver comprises a sinusoidal signal. The method further comprises correlating the received sinusoidal signal to a mathematical reference sinusoidal signal, and determining a specific cycle and a specific phase as a time of flight measurement point based on the correlation.

Additional advantages and other features of the present disclosure will be set forth in part in the description which follows and in part will become apparent to those having ordinary skill in the art upon examination of the following or may be learned from the practice of the invention. The advantages of the disclosure may be realized and obtained as particularly pointed out in the appended claims.

BRIEF DESCRIPTION OF THE DRAWINGS

Reference is made to the attached drawings, wherein elements having the same reference numeral designations represent like elements throughout, and wherein:

FIG. 7 is a block diagram of an acoustic interface module (AIM) according to an embodiment of the present disclosure.

DETAILED DESCRIPTION

System Overview

The present disclosure relates to a position measurement apparatus having a probe including an acoustic signal source, an optical signal source, and a processor for driving the signal sources such that the signals of the acoustic source and the optical source have a known temporal relationship to each other. The apparatus also includes a receiver for receiving the optical and acoustic signals; and a controller for communicating with and controlling the probe and the receiver, and processing data from the receiver.

The acoustic signal source can be a sinusoidally varying acoustic energy source, such as a piezoelectric device, and the optical source, such as an LED, emits a reference signal only during a predetermined portion of the wave form cycle. The processor controls the amplitude and frequency of the acoustic signal responsive to environmental conditions to optimize the accuracy of the apparatus.

The receiver includes a microphone, such as a MEMS microphone, and an optical sensor.

The probe, receiver, and controller can communicate wirelessly with each other. The probe includes a battery and battery charger for providing power to the probe.

The controller coordinates communications between the sensor and the probe, dynamically instructs the probe's processor, and configures the receiver's settings and detection algorithms.

Figure 2:
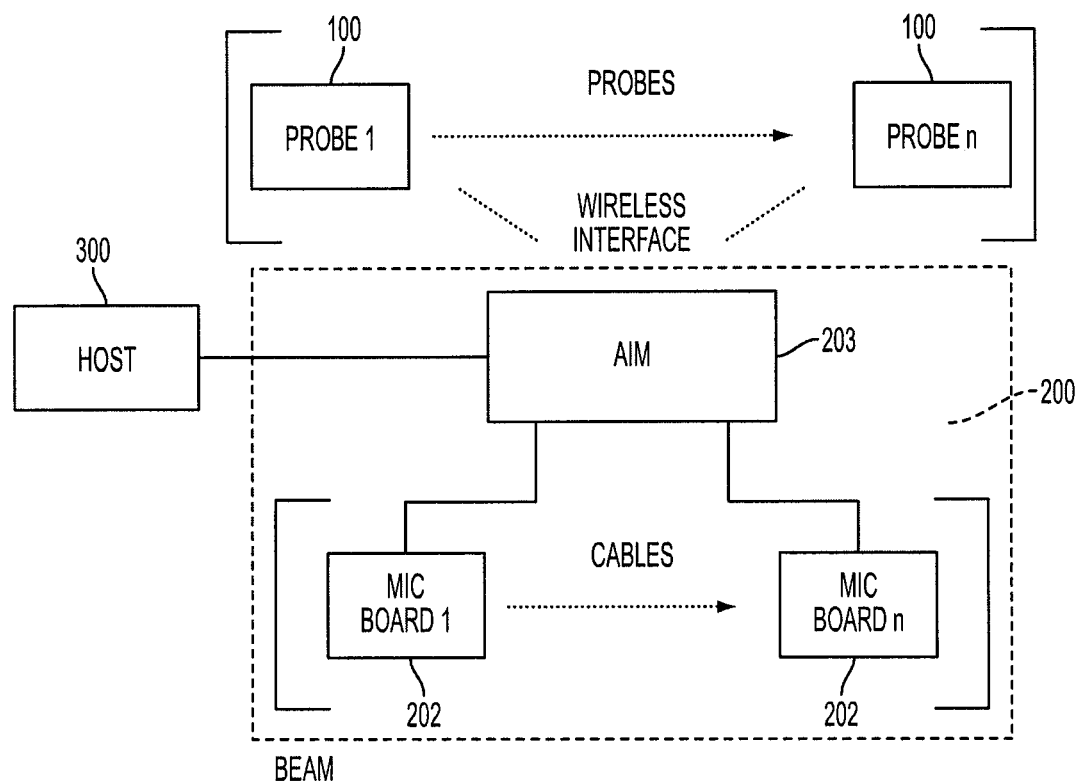
FIG. 2 is a block diagram of an apparatus according to an embodiment of the present disclosure.

One embodiment of the current disclosure will now be described with reference to FIGS. 2-4. A plurality of probes 100 attachable to a vehicle are linked wirelessly (i.e., by radio) to a beam 200, which is connected to a host 300. Probes 100 each have two acoustic energy emitters 101, a light source 102, radio 103, battery 104, battery charger 105 and controller 106. The probe 100 receives instructions from the beam 200 over the radio link to send out acoustic energy. The probe 100 first drives the piezoelectric wafer of one of the acoustic energy emitters 101 using the amplified output of a digital to analog converter, under the control of a microprocessor of controller 106, to create the proper set of waveforms. The stability of the waveform is monitored by the microprocessor which energizes the light source 102 to mark a specific location on the waveform. The probe 100 then drives the piezoelectric wafer of the other acoustic energy emitter 101 in the same way. The probe 100 sends the beam status and timing information as requested to the beam 200. Each probe 100 has a unique identifier and is addressable individually or as a group by the beam 200.

This embodiment further implements a modular set or group of microphones 201 along the beam 200. Each integral group of microphones is contained on a printed circuit board 202 along with the associated electronics, i.e. analog to digital converter, microprocessor, power supplies, etc. Each microphone board 202 is a stand alone sub-assembly and as such may be replaced in the field should a microphone fail or be damaged. Each microphone board 202 may be calibrated individually in the factory and then assembled into the beam 200 on the production line where the beam 200 is then calibrated as a unit. In this way, each pre-calibrated microphone board 202 may be replaced in the field and then the repaired beam 200 can be field calibrated on site without the requirement of send it back to the factory. Field calibration uses redundant probe location data from the original microphones in the beam along with calibration information retained on the new microphone board along with live probe location data from the new microphone board to re-calibrate the beam 200 as a complete unit.

The embodiment further implements an Acoustic Interface Module (AIM) 203 as a controller in the beam. The AIM 203 coordinates the communications between the beam 200 and the probes 100, dynamically configuring, commanding and receiving status for each probe or group of probes. The AIM 203 also coordinates communications between the beam 200 and the host console 300 by a communications link such as Ethernet. The beam 200 and host 300 communication link includes information used to locate probes, probe status, beam status as well as the supporting the downloading of configurations and software updates to the beam and probes. The AIM 203 also coordinates the communications between the AIM and each microphone board 202. Such communications include dynamically configuring the microphone board settings and detection algorithms, commanding functionality, receiving status and receiving probe location information. The AIM 203 includes power regulation circuitry for the components within the beam 200 as well as diagnostic, systems supervisory electronics and control programs.

Each microphone board 202 in the beam also contains two acoustic energy emitters, a light source, and a radio so that acoustic signals can be exchanged between beams the same way as described above between probes 100 and the beam 200. This configuration enables beam expansion capability, as the primary beam can detect and pinpoint the precise location of the secondary beam by analyzing the acoustic signals from it. Ethernet is used between the beams for the AIMs in the different beams to coordinate their communications.

An embodiment of the present disclosure implements sinusoidally varying acoustic energy produced by probes 100 and received by beam 200. While this implementation allows for the use of acoustic energy at a variable frequency, multiple simultaneous fixed frequencies or broad band continuous frequencies (such as a pulse), this embodiment uses a single fixed frequency for each probe. The frequency of acoustic energy used in each probe may be different or may be the same. In addition, the specific frequency produced by the probe may be selected from a group of frequencies. The selection may be by physical switch or by command from a master controller such as the AIM 203 in the beam 200. In one embodiment, the frequency produced by each probe 100 is not selectable and is the same for all probes.

Acoustic Aperture

The acoustic energy emitted by the probe 100 is produced by a moving membrane instead of a spark between two electrodes, as in the prior art. Once energized with a control signal, the membrane cyclically compresses and decompress the air around the membrane. The areas of compressed and decompressed air propagate as acoustic energy. A substantial factor in efficiently transferring the energy from a moving membrane into propagating acoustic energy is matching the source impedance of the moving membrane to the acoustic load impedance of the air. The acoustic impedance is defined as the ratio of sound pressure to the volume velocity which is the particle velocity over an area.

Providing the appropriate acoustic aperture around and in front of the membrane can match the source and load impedance over a specific frequency range. Another advantage of the aperture is to provide a consistent virtual point source for the origin of the acoustic energy. An acoustic source of significant size can produce translation errors as the source is rotated about the central axis of the source. Establishing a consistent acoustic energy point source is necessary to reduce positional measurement error incurred when the probe is rotated or tilted.

Figure 3A:
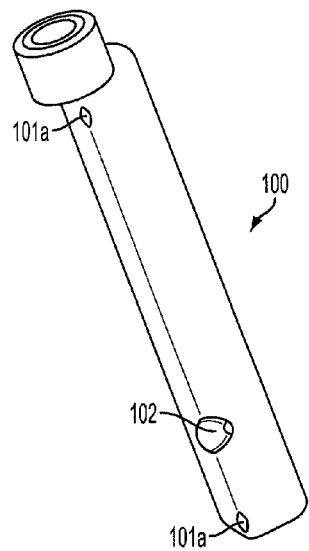
FIGS. 3A and 3B illustrate a probe used with the apparatus of FIG. 2.
Figure 3B:
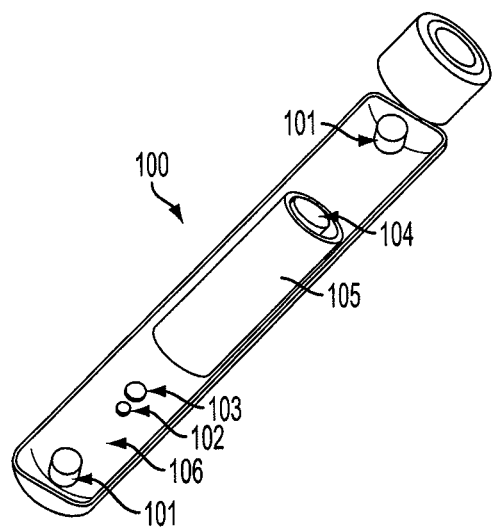
Figure 4:
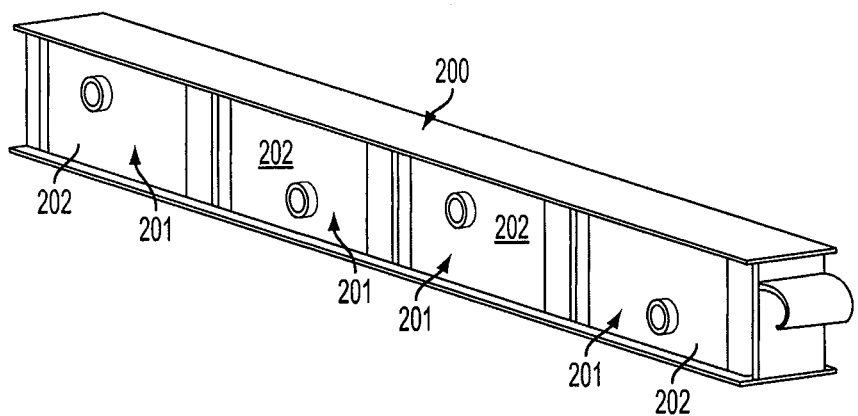
FIG. 4 illustrates a beam used with the apparatus of FIG. 2.

The acoustic apertures 101a shown in FIG. 3A expand through the probe casing following a cutoff frequency dictated exponential contour to facilitate the propagation of the acoustic energy emitted from the piezoelectric transducer (not shown). The radius of the contour at distance x from the aperture throat t is determined as follows:

$$r_x^2 = r_t^2 e^{Bx} \quad (A)$$

Where $r_x$: Radius of the contour at distance x.
$r_t$: Radius of the aperture throat
B: Flare rate constant, $B = 4\zeta f_c/c = 3.65 \times 10^{-5} f_c$, $f_c$ is the cutoff frequency.

For example, if we use 20 kHz as the cutoff frequency, and set the $r_t$ to 0.5 mm, at the distance 8 mm from the throat, x=8 mm, the $r_x$ is calculated to be 9.27 mm.

Time of Flight Measurement

Both the conventional system and the present disclosure depend on accurately measuring the time of flight of the acoustic energy emitted by a probe. In the conventional system, the probe is connected to the beam by a cable such that the precise time that the spark is initiated can be very accurately determined. In addition, in the conventional system, the microphones and associated electronics count time until a component frequency of the pulse of acoustic energy from the probe exceeds a preset amplitude threshold. Since the pulse is very short, about 50 microseconds, the uncertainty of the time of arrival of the pulse is small.

Unlike the conventional system, the acoustic energy of the disclosed system is emitted by the acoustic signal source 101 in a sinusoidal wave train over several cycles as opposed to a single short pulse. Therefore, it is necessary to establish a stable fixed frequency acoustic wave train quickly and accurately. One embodiment of the present disclosure utilizes a piezoelectric crystal wafer as the membrane. The piezoelectric wafer is made to expand and contract by applying a alternating positive then negative voltage across the wafer. As the voltage is initially applied to the wafer, the electromechanical inertia characteristics of the wafer cause it to converge to the final oscillation frequency over several cycles as oppose to instantaneously locking to a stable fixed frequency. During this initial start up time, the wafer produces an unstable frequency and consequently an unstable cycle to cycle phase relationship. Since this embodiment uses phase to determine time of flight, the problem of unstable cycle to cycle phase must be resolved. The disclosure utilizes two techniques to reduce the cycle to cycle phase instability. In the first technique, the probe 100 measures the wafer acoustic energy emissions and, in real time, adaptively corrects for the phase instability by adjusting the piezoelectric wafer's drive voltage and frequency. This adaptive correction is based on an estimated mathematical model of the voltage to acoustic energy transfer function present during startup. This technique drives the wafer to a stable cycle to cycle frequency and phase quickly and efficiently. In the second technique, the microphone 201 and associated electronics receive the acoustic energy from the probe 100, converts the received sinusoidal energy into digital data and then stores it to memory. In this way, the receiving microphone system 202 can use signal processing algorithms over successive cycles to reduce errors in the sinusoidal signal caused by noise, air turbulence, air temperature gradients, etc. A microprocessor processes the data derived from the sinusoidal signal and correlates it phase by phase to a mathematical reference phase that is created or calculated from a system wide reference time base. To measure the time of flight accurately a repeatable and easily identifiable location on the wave train must be established. By calculating and uniquely identifying the phase of each cycle of the input waveform based on a system-wide time base, a specific cycle and specific phase can be predetermined as the time of flight measurement point for all microphones 201 across the system.

Figure 1A:
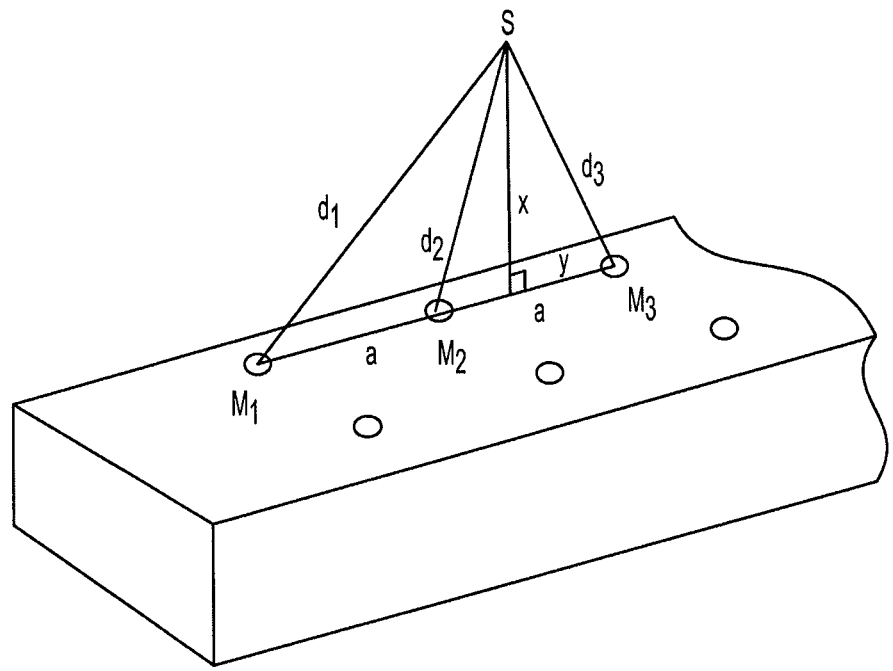
FIGS. 1A and 1B diagrammatically illustrate the principles of operation of conventional position measurement systems.
Figure 1B:
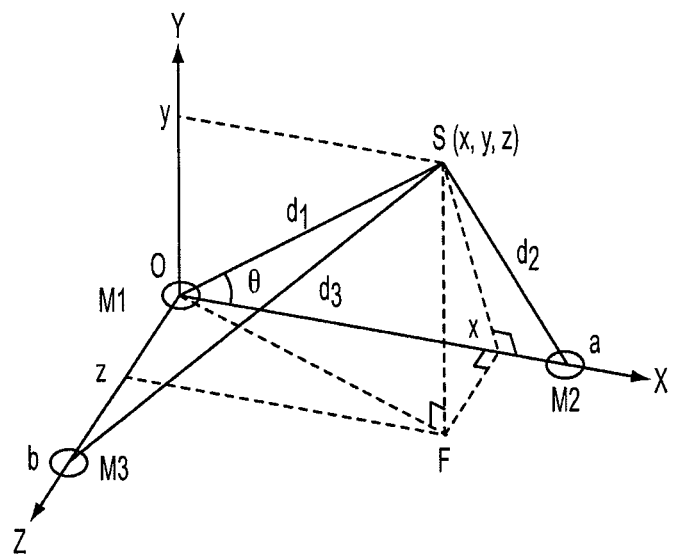

In certain conventional systems, such as shown in FIG. 1A, 24 microphones are disposed on each side of the beam, arranged in a two dimensional matrix. There are 12 microphones on the top row and 12 microphones on the bottom row. Within each row the microphones are spaced 300 mm apart with the two rows spaced 150 mm apart. This conventional system is capable of measuring the three dimensional position of a probe located 1 meter away from the beam to an accuracy of +/−1 mm. The three orthogonal measurement dimensions or directions can be represented by x, y and z, where x is the direction parallel to the beam or the horizontal direction, z is the direction above or below the beam or the vertical direction and y is the range or direction towards or away from the beam.

Given the standard velocity of an acoustic waveform at sea level, i.e. approximately 344 meters per second, the time of flight for an acoustic waveform to travel from a probe at a distance of 1 meter to a microphone directly in front of the probe is approximately 2.9 milliseconds. The conventional system uses the best group of 6 microphones to determine the probe locations. Microphones that receive acoustic energy from the probe off axis have better resolution than microphones that positioned more normal or along the central axis of the microphone. For instance, given a probe at 1 meter away from the beam in y and positioned directly along the axis of a microphone the time of flight is $$1 \text{ m}/344 \text{ m/s} = 2.906977 \text{ mS} \quad (13)$$

If the probe is moved along the x direction by 1 mm so the probe is now 1 mm off axis from the microphone, the straight line distance changes from 1 m to 1.0000005 m.

$$\text{Distance} = \text{SQRT}(1^2 + 0.001^2) = 1.0000005 \text{ m} \quad (14)$$

The difference in the time of flight between 1 meter and 1.0000005 m is $$1/344 - (1.0000005/344) = 1.453 \text{ nS} \quad (15)$$

This is a very small time of flight difference but if the probe is substantially off axis then small changes in distance, such as 1 mm in the x direction, produce larger changes in the time of flight. If we assume that the initial position of the probe is 1 meter away and is off axis by 50 mm then the distance is:

$$\text{Initial distance} = \text{SQRT}(1^2 + 0.050^2) = 1.0012492 \text{ m} \quad (16)$$

If we move the probe in the x direction by 1 mm, the new straight line distance is:

$$\text{Final distance} = \text{SQRT}(1^2 + 0.051^2) = 1.0012997 \text{ m} \quad (17)$$

$$\text{Initial} - \text{Final distance} = 0.00005 \quad (18)$$

The difference in the time of flight between 1.0012492 m and 1.0012997 m is $$0.00005/344 = 0.146 \text{ uS} \quad (19)$$

which is 100 times longer than the previous case.

In this conventional system, the microphone spacing in the x direction is 300 mm, so acoustic energy from a probe initially placed 1 meter away and exactly in between two microphones in the x direction would have a time of flight to each microphone of:

$$\text{Initial distance} = \text{SQRT}(1^2 + (0.3/2)^2) = 1.0111874 \text{ m} \quad (20)$$

$$1.0111874/344 = 2.939498 \text{ mS} \quad (21)$$

A change in 1 mm in the x direction would result in a change in time of flight of:

$$\text{Distance to mic 1} = \text{SQRT}(1^2 + (0.151)^2) = 1.0113362 \text{ m} \quad (22)$$

$$1.0113362/344 = 2.939931 \text{ mS} \quad (23)$$

$$\text{Change in time of flight to mic 1 of}$$
$$2.939931 - 2.939498 = 0.4326 \text{ uS} \quad (24)$$

$$\text{Distance to mic 2} = \text{SQRT}(1^2 + (0.149)^2) = 1.0110396 \text{ m} \quad (25)$$

$$1.0110396/344 = 2.9390685 \text{ mS} \quad (26)$$

$$\text{Change in time of flight to mic 2 of}$$
$$2.939498 - 2.9390685 = 0.4298 \text{ uS} \quad (27)$$

It is clear by this example that microphones further away in the x direction have more resolution in the x direction and the same is true in the z direction. Therefore the best group of microphones is a selection that are farther away but not so far that the acoustic energy has dissipated below the threshold of sensitivity of the microphones.

As shown, the direct accuracy of the conventional system is dependent on the resolution to which the system can accurately measure the time interval of an acoustic energy pulse from emission at the probe until the receive energy threshold is exceeded at the microphone. In the disclosed system, the direct accuracy is dependent on the resolution to which the phase of a cycle can be measured in relation to a reference phase produced mathematically from a very accurate time base. In one embodiment, the piezoelectric crystal wafer is driven to produce a 40 KHz frequency acoustic energy waveform. The time to complete a single cycle at 40 KHz is 1 cycle/40000 cycles/sec or 25 microseconds. Propagating at a velocity of 344 m/s, a single cycle of 40 KHz acoustic energy will travel approximately 8.6 mm;

$$344 \text{ m/s} * 0.000025 \text{s} = 0.0086 \text{ m or } 8.6 \text{ mm} \quad (28)$$

Referring back to probe placement above, a 1 mm change in displacement in the x direction results in as little as 0.146 uS change in the time of flight. This change is equivalent to approximately 2.1 degrees of phase;

$$40{,}000 \text{ cyc/s} * 0.000000146 \text{ s} = 0.00584 \text{ cycles} \quad (29)$$

$$360 \text{ degrees/cycle} * 0.00584 \text{ cycles} = 2.1024 \text{ degrees of phase} \quad (30)$$

In the conventional system, the beam was designed to be placed down the length of the vehicle or longitudinally. This requires that the beam be 3.6 meters in length which is a cumbersome size for a technician to move and position. In the presently disclosed system, the beam is placed across the width of the vehicle or in a transverse position. In the conventional system, the probes are typically placed no more than one meter from the beam. However, according to the present disclosure the probes may be placed as far as 2 meters from the beam. Redefining the equations above to account for a 2 meter distance from the beam in the y direction, the time of flight change becomes much less;

$$\text{Initial distance} = \text{SQRT}(2^2 + 0.050^2) = 2.0006249 \text{ m} \quad (31)$$

If we move the probe in the x direction by 1 mm, the new straight line distance is:

$$\text{Final distance} = \text{SQRT}(2^2 + 0.051^2) = 2.0006501 \text{ m} \quad (32)$$

$$\text{Initial-Final distance} = 0.0000252 \quad (33)$$

The difference in the time of flight between 2.0006249 m and 2.0006501 m is $$0.0000252/344 = 0.073 \text{ uS or } 73 \text{ nS} \quad (34)$$

This is approximately 1 degree of phase;

$$40{,}000 \text{ cyc/s} * 0.000000073 \text{ s} = 0.002935 \text{ cycles} \quad (35)$$

$$360 \text{ degrees/cycle} * 0.002935 \text{ cycles} = 1.057 \text{ degrees of phase} \quad (36)$$

Probe

Probe Function:

The probe 100 provides a reference signal at a known temporal relationship to an acoustical signal, so that a measurement of the time required for the acoustical signal to travel from the probe to one or more receivers can be determined. This requires that each of the signals must be such that a known temporal reference point can be determined from each signal individually. The precision with which the acoustic signal is generated, both in time relative to the reference signal, and in waveform, affect the accuracy of the disclosed device. The probe 100 is intended to affix to a variety of measurement points on a vehicle.

There is additional relevant information relating to each signal, such as the relative intensity versus time. There is also additional relevant information regarding how the two signals relate to each other, such as the time between the presence of one signal and the other. This information must either be known to the receiver (e.g., beam 200) or provided from the probe 100 to the receiver(s).

Moreover, there may be multiple probes 100 in the system, so there must be a way for the receiver(s) to determine which of the probes is providing a signal at a given time. This is accomplished by using one or a combination of the following methods, such that each probe may be uniquely identified: 1) activating only those probes that will not be confused with other probes at that time due to proximity; and 2) having the probes signals differ in some characteristic such that the receiver(s) can distinguish between them. Such characteristics might include one or more of modulation, base frequency, and color.

In conventional systems, a voltage signal generated in the beam thru a step-up transformer is transmitted via wires to a probe which converts this to an acoustic signal. This acoustic signal is generated by creating a spark across a pair of electrodes. This mode of operation has several drawbacks. A spark has a significant electro-magnetic output in addition to the acoustic output. This additional energy is subject to regulations regarding unwanted radio emissions. A spark requires substantial power and so requires a large power source and therefore almost certainly requires a cable. A spark may vary its acoustic characteristics depending upon temperature, humidity, and barometric pressure. Most significant is that the voltage required for the spark to occur between the electrodes varies on these characteristics and may occur earlier or later than expected. Small changes in the low-voltage input to the voltage step up circuit result in larger changes in the high voltage output. The high voltage output determines the time at which the spark is emitted.

The presently disclosed system has at least the following improvements:

1) It supplies a better defined acoustic signal at a more precise relationship to a known reference signal.

2) It lowers power consumption such that it may be used without wires allowing easier attachment and use.

3) It has no spark and therefore has much lower unwanted radio emissions.

4) It can be characterized to its signal waveforms and delays.

5) It can adjust its signal waveforms and delays to accommodate changes in the environment.

6) It can store and transmit its signal characteristics to the rest of the apparatus to allow for more accurate determination of the signals temporal relationship.

In its simplest embodiment, the present disclosure has an acoustic source 101 and an optical source 102. The acoustic source 101 and optical source 102 are driven so that they provide signals having a known temporal relationship to each other. As an example, the acoustic source 101 is driven at a known frequency and the optical source 102 emits only during the positive cycle of the wave form. By figuring the delay from the start of the optical signal to the zero crossing of the rising acoustic wave, a very accurate time relationship can be calculated. Having multiple crossings and signals allows averaging to eliminate many errors and elimination of errors caused by extraneous optical and acoustic events.

With the addition of a processor and sensing means, the disclosed system is improved by compensating the output signals for environmental and manufacturing variations. For example, the delays in an application of the power to the acoustic source 101 and the actual emission of acoustic energy can be calculated and used to offset when the optical signal is generated. With a feedback mechanism for the acoustic source 101, the acoustic output can be tuned to output a more consistent waveform over variations in temperature, pressure, and humidity.

With the addition of a communications mechanism, such as the radio 103, the characteristics of the acoustic and optical sources 101, 102, and their relationship to each other, can be transmitted to the receiver (beam 200). The acoustic waveform envelope of a particular probe 100 can be used to better determine its temporal relation to the optical source 102 and/ or distinguish it from other probes 100. The communications mechanism is also used to enable or disable one or more probes 100 so that measurements may be made. Additionally, the communications mechanism (radio 103) combined with the processor of controller 106 and sensors allows diagnostic information to be presented to the receiver so that system failures are made known to the user.

With the provision of an energy source such as battery 104, the probe can operate without wires. With sensing means the probe can provide information to a receiver about the condition and state of charge of the battery 104. Use of a rechargeable power source allows for the probe to be sealed against much environmental debris. Use of an inductive coupling (battery charger 105) allows for the charging of the battery 104 without the use of contact points subject to corrosion and damage in the shop environment.

Example of a Probe According to the Present Disclosure

Acoustic Sources:

In one embodiment, the acoustic signal is a waveform with its dominate frequency in the ultrasonic range. The waveform is created by a digital to analog converter from the processor. The processor controls the amplitude of the signal by controlling the feedback of the voltage amplifier. The acoustic emitter is a piezo device. Use of a controlled shape in the probe body makes the emission point source more defined. The presence of a current measurement means in the drive circuit for the piezo allows the processor to determine when the piezo oscillations are stable. The emitter is driven to achieve a stable sinusoidal waveform as quickly as possible, held for a number of cycles, and then turned off. To achieve this, the piezo is driven as hard as possible the first few cycles to get the element moving. After that, the drive may be reduced to lower the output magnitude. With the piezo emitters used, the frequency driving the piezos was slightly above the resonant frequency of the peizo element in order to get a better stability. Two emitters are used per probe and their known relative position allow the system to determine the location of the connected end. The relative position of the two emitter sources and the connection point of the probe is one set of parameters that are stored in the probe processor for transmittal to the receiver.

Reference Signal:

In one embodiment, the reference signal is an optical (infra-red) emitter (light emitting diode). The reference signal is modulated by the processor starting at the same time as the waveform for the acoustic signal starts. The emitter is pulsed at a rate of 500 KHz for 10 cycles. The duty cycle of the output is regulated to a value at or below 50%. The lower duty cycles reduce power consumption and avoid overdriving the receiver circuits in the beam.

Processor and Sensing:

The processor drives the acoustic waveform and senses the current in the drive circuits. The processor has non-volatile memory which allows for the storage of probe specific variations for calibration. It also has a temperature sensor which may be used to further compensate the waveform used to drive the acoustic source. If the temperature variations in the probe sources are known the temperature sensor reading may be used to adjust the parameters supplied to the receiver. Additionally, it may adjust the acoustic waveform to accommodate changes in the emitter characteristics and the environmental characteristics. The temperature sensor reading is available to the beam for calculations of the speed of sound and temperature gradients of the air.

Communications:

The processor is connected to a low power radio that operates under the 802.15.4 standard. This radio has an output signal to wake the processor when it has been accessed. This allows the probe to conserve power until enabled by the receiver. The radio is also used to provide calibration, diagnostic, and power status data back to the system.

In this implementation, a USB connection is added as a means for uploading new firmware, an additional energy source, and a secondary means of accessing the stored parameters in the probe. In case of failure of the radio in the charger, a probe can be dynamically configured to act as the console communications radio thru the USB attachment.

The optical emitter is also used for certain other signaling tasks, for example, communications with a charging fixture. This embodiment also includes a visible indicator, such as a visible LED. This LED is illuminated when the probe is active. This information aids the operator to prevent confusion about which probe is at which location on the vehicle. In the case of problems with the probe, the LED is flashed in specific patterns to indicate the nature of the problem.

Energy Source:

A rechargeable lithium ion battery provides power. A battery monitor circuit ("gas gauge") tracks the available charge, charge capacity, voltage and current draw.

Alternative Embodiments Relating to the Probe:

In another embodiment, the probe's processor uses the known delay of the acoustic source to determine when to activate the reference source. In this system, probes provide reference signals with predefined periods before the acoustic signal.

In another embodiment, the reference source is a radio frequency signal.

In another embodiment, the reference signal uses the same medium (typically optical (infra-red) or radio) as the communications interface. This enables a reduction in the hardware. The communications must have a very consistent delay from receipt of signal to decoded output. A simpler path is to tap just after the physical reception of the signal (for example after the optical receiver, or radio demodulator/amplifier) and use that as the reference signal. This avoids the delays inherent in further processing of the signal required for the data stream.

In a further embodiment, the reference signal is gated by waveform for driving the acoustic source such that the optical source emits only during the positive cycle of the acoustic wave form. It may be modulated by the processor during this period as well, to emit blocks of higher frequency pulses which are demodulated by the receiver. The advantage of this embodiment is that the demodulated reference signals mark each rising edge of the acoustic signal providing more points for timing the signal without having to send acoustic waveform information over the communications path.

In a similar embodiment, the reference signal is used in a manner to provide information about the acoustic source. For example, the number of pulses in the reference signal indicates the time required for the acoustic signal to become stable, or there is a pulse of a known number of probe processor clock ticks to allow the beam to calculate the driven acoustic waveform frequency.

In another embodiment, the reference signal is enabled and then turned off when the acoustic emitter is enabled. This is an advantage if the receiver has better timing accuracy for the cessation of the reference signal than the commencement of the reference signal.

In a further embodiment, the temporal reference point of the acoustic signal is its cessation, or a change in its amplitude or frequency. Using a change in modulation as the reference point in the acoustical source has the potential for increased accuracy because the startup period of the source is no longer a factor in its timing uncertainty.

While an exemplary embodiment strives to make the acoustic signal as precisely defined as possible, an alternative is to measure the generated acoustic waveform at the source and transmit that information to the receiver over the communications link after the acoustic emission has completed. This has the potential for greater accuracy if the precision with which the signal is measured is better than the precision with which the signal is generated.

In another embodiment, a microphone on the probe is used as the sensor for feedback on the acoustic output. This could be used solely or in addition to the current sense circuit.

In another embodiment, the probe has the sensors to receive the reference source and the acoustic source and the beam has the emitters.

In another embodiment, the probe's energy source is a "super" capacitor or a battery paired with a "super" capacitor.

In one implementation, several of these reference/acoustic timing mechanisms are selected programmatically. In another embodiment, the probe is dynamically configured (either by selection of a desired mechanism already existing in firmware or by loading task specific firmware through one of the communications means) to the timing mechanism most appropriate for the position/current use of the probe.

In a further embodiment, the physical connections to the probes and/or charger are via Ethernet. Optionally, these are the standard powered Ethernet, or, for the charger, a customized higher power version with the same connections.

Exemplary Probe Circuit Design

Figure 5A:
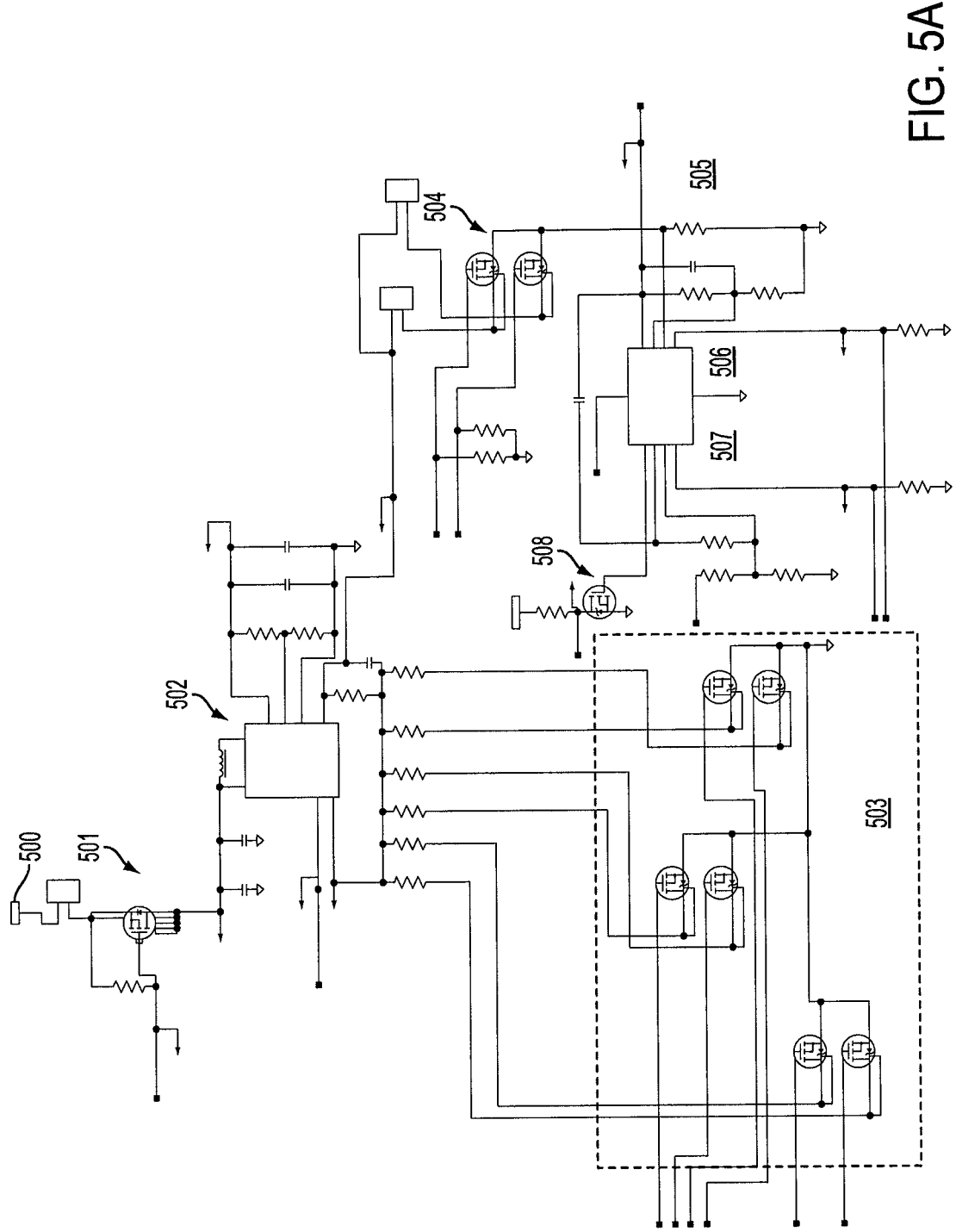
FIGS. 5A and 5B are schematic diagrams of a probe according to an embodiment of the present disclosure.

Piezo Driver:

An example of a probe circuit will now be described with reference to FIGS. 5A and 5B. The piezo driver shown in FIG. 5A dominates the requirements for circuit design. The piezo requires a 20V signal for maximum output. A battery 500 is input thru a MOSFET 501 to allow the shutdown of the driver to reduce power consumption during idle periods. The driver selected was a LT3469 piezo actuator 502 with built in boost circuit. Voltage control/waveform amplitude is controlled by discrete MOSFET switches 503 from the feedback path of the amplifier of actuator 502. Amplitude control is less critical than waveform shape in discerning accurate timing. By using discrete amplitude switches 503, the resolution of the D/A converter can be used to provide optimal signal waveform shape. Additionally, higher amplitude waveforms for the first several cycles of the piezo shorten the time required for the sound to ramp up to the desired output level. With discrete switches 503 for amplitude, it is possible to quickly change the output gain at zero voltage crossings and reduce waveform distortion.

In one alternative implementation, the acoustic waveform has both its shape and its amplitude controlled by the output of a digital to analog converter. This is a simpler signal path but requires more resolution from the digital to analog converter.

The output of the amplifier of piezo actuator 502 is sent to both piezo elements. A pair of MOSFETs 504 is used to switch either one or both elements on by enabling the low side connection path thru a sense resistor 505. The sense resistor 505 is passed through an amplifier 506 and back to an analog to digital converter (ADC) on the controller. This gives a means of measuring the current of the piezo device.

To support an alternate embodiment, the amplified sense resistor voltage is capacitively coupled to an amplifier 507 configured to allow for driving a MOSFET 508 as the output current crosses zero. A digital to analog converter (DAC) from the controller allows adjusting the output level for accurately adjusting the turn on of the MOSFET 508. This output is connected to an LED that is used by the microphone board to measure timing of the emitted sound. The intent is that the LED will be enabled very precisely with the zero cross current of the piezo and thus allow very accurate determination of waveform timing on the microphone board. There is another direct drive path from the controller to the LED for communications.

The controller uses timing derived from calibration of the probe in a known test case to determine when to fire the LED to provide a signal to the microphone board at a predetermined time relative to the emission of the sound. The circuitry provides for this implementation by using an extra MOSFET to drive the LED and a logical AND gate to disable the acoustic circuit drive to the LED.

One further implementation allowed by this circuit is that the controller can change the modulation frequency of the optical signal by modulating the enable of the acoustic circuit drive to the LED. This makes the output of the optical circuit a higher frequency signal which turns on only when the acoustic waveform is positive. This same mechanism can be used for yet another purpose. If the optical emissions from the LED are too high, such that they adversely affect the accuracy of the receiver circuits in the beam (e.g., overload the input and filter circuits), the LED output strength can be adjusted by controlling the ratio of its "on" period to its "off" period. This is a standard technique referred to as pulse width modulation.

Figure 5B:
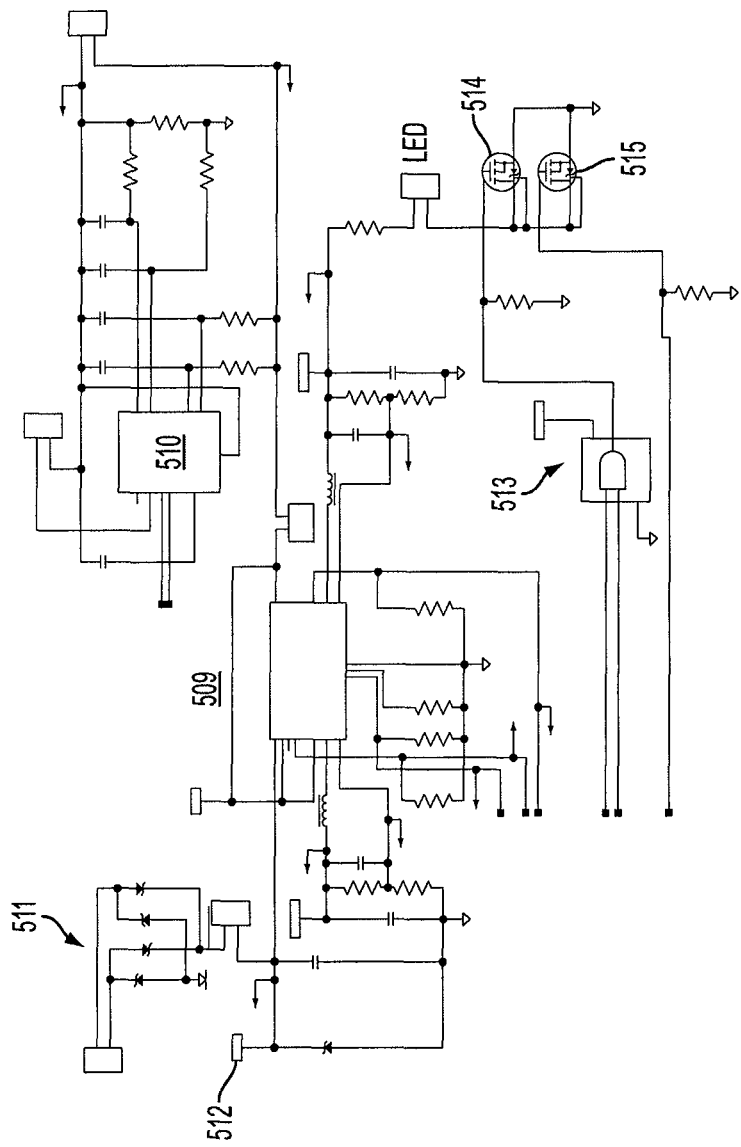

LED Driver:

Referring now to FIG. 5B, one LED drive circuit is from zero cross detector driven by the acoustic sense circuit. This is ANDed 513 with a direct line from the controller to allow the modulation and control described above. It drives a MOSFET 514 on the low side of the LED. Another path is a direct connection from the controller to a different MOSFET 515 on the low side of the LED. This allows for complete control by the controller or use of the LED for communications in addition to the zero cross driven reference circuit.

Power Supply:

Switching Circuit:

The power supply 509 allows inputs from three sources: a battery, an inductive pickup, and a USB connection. The primary output is a 2.5V source. This output is always enabled. The voltage level allows a step down configuration instead of a buck-boost. It is also at or below the lowest voltage the battery (such as a lithium ion battery) is designed to output for use. This has advantages in both efficiency and simplicity of circuitry. The radio and the processor of the probe are selected with this lower voltage as a criterion. The disclosed circuit allows for monitoring the battery current, which duplicates a feature in the "gas gauge" described below, allowing an additional diagnostic check. The switching supply can change from its normal synchronous mode to a pulse skipping mode when the unit is idle, to reduce power consumption.

The power supply is capable of powering the radio and processor while charging the battery. No input is required from the controller to enable the charger. There is a second switching supply within the chip which is dedicated to the LED output. By using a separate switching supply here, power savings are realized over using the higher voltage of the primary supply followed by a linear regulator.

The power supply includes charging circuitry for the Lithium Ion battery. The input power for this is either rectified from an inductive coil 511 or from the 5V line on the USB 512.

Gas Gauge:

The gas gauge 510 monitors the charge in the battery and the battery's capacity. By making this information available to the system, several features are made possible. The charger station can stop supplying power to the inductor circuits when the battery is at full charge. The end user will be able to plan when to charge his probes so as not to have a dead probe in the middle of a work session. The end user can see, and the system can warn the end user, that the batteries are ending their useful life and should be replaced soon. Excess current consumption or charging can be detected as a diagnostic aid in indicating a problem with the probe.

Probe Operation

1. Probe 100 is removed from charger and attached to a measurement point on the frame of a vehicle. The probe's processor 106 is in sleep mode with all circuits except the radio 103 powered down.

2. The beam 200 sends a radio packet to wake the probe 100. A wakeup signal line from the radio 103 to the processor 106 is toggled and the processor 106 goes to active mode.

3. The beam 200 queries the processor 106 for its stored calibration parameters. The probe 100 responds with the stored data.

4. The beam 200 sends a message to power up the probe 100. The probe 100 enables the power supplies to the LED and acoustic circuits.

5. The beam 200 sends a message to activate the probe 100 which includes power settings for the acoustic source 101 and the optical source 102 and which emitter to drive. The probe processor 106 sets the duty cycle of the reference optical source 102 to the specified strength. The probe processor 106 sets the gain for the acoustic output at maximum gain. The probe processor 106 begins the modulated drive of the reference output and starts the output of the acoustic waveform. When 10 cycles of the reference signal have been transmitted, the probe processor 106 ceases output of the modulated drive of the reference output. The probe processor 106 drives the acoustic waveform for a predetermined number of cycles (e.g., 3 cycles) and at the zero crossing point at the end of these cycles, sets the amplitude adjustment to the value transmitted from the beam 200. An additional number of cycles is generated (e.g., 7 cycles). The probe processor 106 then disables the LED enable and ceases acoustic waveform output from that emitter 101.

6. The beam 200 may send additional messages to activate the probe 100 which may have different amplitude values depending upon the strength of the received acoustic and optical signals or specify the other emitter 101. The probe 100 will respond as in the previous step. This will continue until the beam 200 ceases sending messages.

7. The beam 200 either sends a message to deactivate the probe 100 or a specified period elapses without a message from the beam 200. The probe 100 disables the power supplies for the acoustic and LED circuits and enters a low power sleep mode.

There are numerous variations to this messaging structure with what is optimal depending on the time delay in sending a message. For example, if the time required for an individual message is low, messages for setting the parameters of amplitudes and cycle counts can all be separate. The probe 100 can also keep using the last parameters supplied each time it is activated. If the time for each message is high, the probe 100 could keep sending reference and acoustic signals from alternating emitters at specified intervals until told to cease. These details do not change the essential function of the probe.

In an alternative embodiment, after an acoustic emission, the beam 200 will request the emission data from the probe 100. The probe 100 then transmits information about the last transmission including the delay from reference signal to acoustic emission, and the sensed information about the acoustic emission waveform. This allows the beam 200 to base its position calculations on the specific measured acoustic waveform for a higher degree of accuracy. This mode of operation might be preferable if it is more economical in a particular implementation to measure the variation in output rather than control the output to the precision required.

In another embodiment, the probes 100 are given offset periods and group numbers. A broadcast message from the beam 200 starts all the activated probes' clocks and at the specified offset the probe 100 emits its reference/acoustic signals with whatever other parameters were specified. This broadcast command can also specify groups of probes. This allows one broadcast command to acquire reading from the frame reference points and another to specify probes from the region of the vehicle undergoing modification.

There are additional commands used by the system for diagnostics and management of the system. These include diagnostics, battery status, charge management, temperature.

Probe Calibration:

The probe 100 has multiple parameters that are subject to variation in manufacture that negatively impact the accuracy of the system. To reduce the error induced by these variations and to reduce the precision and cost required in the manufacture of the probe 100, an embodiment of the probe 100 is calibrated and parameters are stored within the non-volatile memory of the probe processor 106. One embodiment of the probe 100 includes a physical connection for power and communication, such as a USB connection, to perform this task. It is possible to perform this task with the other communications means (radio 103, modulation of the optical reference source 102) but this connection makes the process faster, more reliable, and not subject to battery charge state.

The parameters calibrated in this embodiment are the delay from the start of the reference signal to a detectable output acoustic signal, the relative positions of the two acoustic emitters 101 and the mounting point of the probe 100, and the point of rotation of the probe 100 about the mounting point, and output frequencies of the acoustic emitters 101.

To calibrate the probe parameters, the probe 100 is placed in a mounting fixture at a known location relative to three calibrated microphone boards 202 at different distances. The timing for all three microphone boards 202 is driven from a single precision clock source. The true frequency of the emitters 101 is determined based upon a DFT of the digitized acoustic signal as received in the microphone boards 202. The measurements of the reference source 102 to acoustic source delays and the perceived location of the two emitters 101 determined relative to the known position of the probe mounting point for the probe is determined by a least squares fit of position error based upon all 9 microphones. The probe 100 is rotated in the fixture a known angle and the positions of the emitters 101 determined again to measure the off axis point of rotation of the probe mounting point. When these parameters are written to the probe 100 a unique identifier is also written. This identifier is used by the system and radio 103 to identify a specific probe.

In the case of alternative embodiments based upon other waveform characteristics (cessation of signal, change in signal amplitude, etc.) the timing parameter is matched to the chosen embodiment.

Diagnostics and Status:

The probe 100 has information that indicates when the probe is or is not operating properly and information about the status of the battery 104. In one embodiment, these can be returned to the system via USB or radio 103. This embodiment has the following diagnostic and status information:

1. Battery Voltage
2. Average battery current draw/charge
3. Calculated batter capacity
4. Temperature
5. Charger Supply voltage
6. Acoustic Emitter current waveform
7. USB Connected/Unconnected
8. Radio receive signal strength Probe Charging Charger Design:

A charger assembly (not shown) accepts multiple probes 100 and, via inductive coupling, provides power to individual probes 100 for recharging the battery 104. To control this power, the charger needs to detect the presence of a probe 100 and have a communications mechanism to know when power is no longer required. One embodiment includes the radio for the system console to handle both requirements.

The presence of a magnetic field from the attachment point of the probe 100 can trigger a hall effect device or magnetic reed relay to signal the charger that a probe is docked. AC Power is applied to the coils and charging begins.

With the communications mechanism, it is possible for the probe to monitor the voltage and communicate the power required back to the charger. This will allow reduced power from the charger. Communications in certain embodiments is by radio, and other embodiments utilize the LED or even the acoustic output 101 of the probe 100.

The presence of multiple probes 100 makes the problem of unwanted EMI from the inductive coils a problem. Therefore the charger varies the frequency of waveform delivered to each coil to reduce the unwanted radio-magnet emissions. The feedback from the probe reporting the voltage induced after rectification allows the charger to reduce the duty cycle/amplitude which further reduces the unwanted EMI.

Alternative designs place the probe charger in the beam 200. This has the advantage of reduced storage space required for the system. Another embodiment includes the power source for the beam 200 within the charger. A variation of this includes locating the communications to the beam 200 within the charger module.

Beam

Microphone Board

Overview

The disclosed system includes multiple probes 100 and at least one beam 200. Sensing elements in the beam 200 are divided up into multiple microphone boards 202. The primary objective of each microphone board 202 is to receive acoustic energy and an optical trigger generated by a probe 100 and calculate the time of flight of the acoustic energy as it travels from the probe 100 to the microphone board 202. The secondary objective of each microphone board 202 is to act like a probe to a secondary beam. The purpose of the secondary beam is to extend the measurement range of the system. The microphone board 202 incorporates an optical transmitter and acoustic source similar to the probe design. This allows one beam 200 to locate the other using the same method it locates a probe, thereby determining the spatial relationship between the beams 200. The microphone board 202 physically mounts the microphones and probe elements. The position of these components is calibrated at the factory, and the results are stored on the microphone board 202 so that a microphone board can be replaced at a customer location.

The microphone board 202 includes an optical detection circuit. The probe 100 generates a synchronization signal using light pulses. The signal is received by the microphone board 202. The detection of this signal is correlated to the time the acoustic energy leaves the probe 100.

In order to calculate time of flight, each microphone board 202 has acoustic sensing elements. These elements convert acoustic energy to an electrical voltage or current. The acoustic energy is conditioned and converted into a digitized acoustic waveform for processing by a microprocessor on the microphone board 202. The microprocessor calculates from the digitized acoustic waveform the time difference between the optical trigger and the time the acoustic energy arrives at the acoustic sensing element. This time delta is the "time of flight" for the acoustic energy.

Each microphone board 202 has two acoustic sources. An acoustic source is a device that converts an electrical impulse into acoustic energy. The two acoustic sources are placed with predetermined separation on the microphone board 202. By locating each source in space the location and orientation of the microphone board 202 is known. This allows the primary beam 200 to calculate the position and orientation of any additional beam 200 which instantiates a microphone board 202 and is positioned within the primary beam's operating envelope. As in the probe 100, an optical transmitter is provided in situ to the acoustic sources for time of flight calculation.

Each beam 200 contains multiple microphone boards 202 mounted in two planes which create the two long sides of the beam 200. A wired interface is provided within the beam between an Acoustic Interface Module (AIM) and each of the microphone boards. This interface includes power, data communications, and signals for inter-board synchronization. The data communications are used to transmit time of flight information to a central processing location where position of the probe 100 will be calculated. This interface is also used to exchange data such as diagnostic, configuration, and calibration information. Each microphone board 202 is calibrated and the results stored on the microphone board 202 in persistent memory such that a board can be replaced at a customer location without the beam requiring calibration at a manufacturing or repair center. The communication interface is also used to update the firmware on the microphone board at a customer location. Under some operating conditions, time of flight information from multiple microphone boards 202 is required to calculate the position of a probe 100. Multiple boards observe a single acoustic event. Because of manufacturing variation between the microphone boards 202 it is necessary for these boards to share a trigger signal, which marks the time the acoustic energy leaves the probe 100, and have synchronized time bases. The synchronization signals provide a means for sharing a trigger event between microphone boards 202 and for calibration to compensate for timing variations in the micro-processing units on the microphone boards 202.

The microphone board 202 includes provisions for self diagnostics. Each board will be able to independent identify and report faults such that system errors can be quickly diagnosed, and it is clear if an individual board requires replacement.

Example

Figure 6:
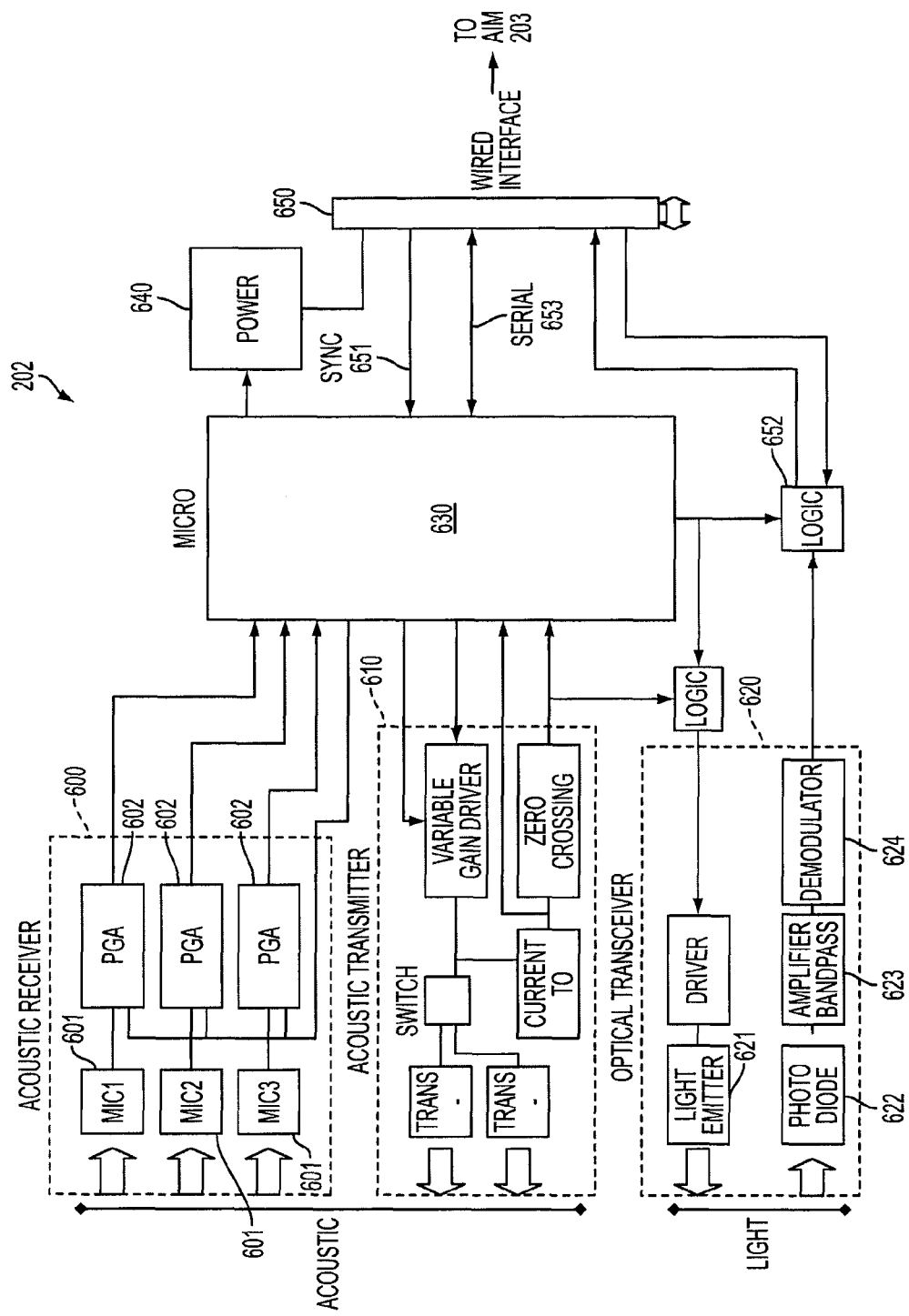
FIG. 6 is a block diagram of a microphone board according to an embodiment of the present disclosure.

An embodiment of the microphone board 202 of the current disclosure is shown in FIG. 6. In this embodiment, the separation of the probe and beam is specified as 250 mm to 2 m. The system must calculate the position of a probe with an accuracy of +/−1 mm. To meet these requirements the microphone board must return the time of flight for the acoustic energy with an accuracy of +/−70 ns.

This embodiment of the microphone board consists of an Acoustic Receiver 600, an Acoustic Transmitter 610, an optical transceiver 620, a micro processor 630, power regulation 640, and a wired interface 650. In this embodiment the Acoustic Receiver 600 consists of microphones 601, and programmable gain amplifiers 602 under the control of the microcontroller 630.

In this implementation the microphones 601 are implemented with a conventional surface mount wide-band ultrasonic acoustic sensor. This device converts acoustic energy to an electrical voltage. The peak sensitivity of this sensor is between 40 kHz and 60 kHz. As described herein above, acoustic energy is produced by the probe 100 and received by the microphone board 202. The probe produces a sinusoidal acoustic signal at ~40 kHz containing multiple periods. Each microphone board 202 will mount and measure data from 3 microphones 601. Surface mount microphones 601 are used to achieve accurate placement of the microphones in relation to each other. The board 202 is calibrated during manufacturing to compensate for variations in mounting position of the microphones 601. This calibration information is stored on the microphone board 202 so that if the board is replaced in the field the calibrated position of the microphones is available to the system for the new board.

The voltage output of each of the microphones 601 is connected to a programmable gain amplifier ("PGA") 602. This electrical circuit consists of typical fixed gain amplifiers combined with an amplifier whose gain is controlled by the micro processor 630. In this implementation, the separation of the acoustic source 101 on the probe 100 and the microphone 601 on the microphone board 202 can vary from 100 mm to 2 m. One skilled in the art will understand that intensity of the sound decreases in proportion to the square of the distance separating the source and the receiver. Hence the signal level produced by the microphone 601 will also decrease by the square of the distance between the probe transducer 101 and the microphone 601 being measured. In addition to changes in distance, the output of the probe transducer 101 is directional. If a line were drawn from the center of the transducer to the source, as the angle between this line and the normal vector to the source is increased the sound intensity will decrease. The PGA 602 is necessary to compensate for changes in received sound intensity resulting from changes in the probe 100's position and orientation. The gain of the PGA 602 is dynamically set by the microcontroller 630 to maintain the best signal level for digital conversion of the voltage over all possible separations and probe orientations within the scope of the apparatus' operating envelope.

Manufacturing variations within the PGA circuit 602 may result in phase shift and propagation delay of the acoustic wave for such that it exceeds the 70 ns accuracy requirement of the system. The selected microprocessor 630 includes a digital to analog converter or DAC. The DAC is used to produce a known analog output under the control of the microprocessor 630. One of the DAC outputs of the microcontroller 630 is combined with the output of microphone 601 using a summing amplifier at the point the signal enters the PGA 602. This serves two purposes: it allows the microcontroller 630 to set the DC offset of the amplifier chain; and allows a known test signal to be injected into the PGA circuit and measured by the microprocessor 630. By comparing the test signal to the signal measured at the output of the PGA 602, a compensation for time error of the PGA 602 can be calculated. In addition, the test signal and the output of the PGA 602 can be compared to test the PGA 602 and determine if it is operating properly during diagnostic testing.

The output of the PGA 602 will be sampled by an analog to digital converter, or ADC, contained in the microprocessor 630. The digitized wave form produced by the ADC is stored in the memory of the microprocessor 630 and is used to calculate the time of flight. The difference in time of flight from the probe 100 to multiple microphones 601 is used to calculate the position of the probe 100. It is not possible with the technology in this implementation to using a single ADC and successively sample the three microphone signals while maintaining a common time base between the digitized waveforms with accuracy of 70 ns. Implementation of a successive sampled system which meets the timing requirements would be cost prohibitive. Microcontroller 630 therefore incorporates 3 independent ADC converters. These converters share a common sample clock. While individual samples will shift in time within the manufacturer specified clock jitter of the microprocessor 630, the time error will average to 0 over the full sampled wave form. In this implementation the ADC samples at 1 MHz. This results in 25 samples per period of the sampled wave form. The sample rate is selected to provide an integral number of samples per period of the acoustic waveform. To achieve 70 ns resolution the phase delta between the measured waveform and a mathematical wave from is calculated. The relationship between the emitters is calibrated in the factor. This information is stored in persistent memory on the main board so that the board can be replaced in the field.

The acoustic transmitter 610 and the optical transmit section 621 of the optical transceiver 620 match the implementation found in the probe design. Microphone board 202 produces the same acoustic signal and optical trigger output as a probe 100, allowing its position and orientation to be measured by a beam using the same method applied to a probe. Hence, when the microphone board 202 is placed in a secondary beam, the secondary beam's location and orientation to the primary beam 200 can be measured by the primary beam 200.

The optical transceiver 620 contains a light detection circuit 622-624. This circuit consists of a photo detector (photodiode) 622, analog circuitry 623 for amplification and filtering of the received signal, and circuitry 624 for demodulation. In this implementation the probe 100 produces a burst of infrared (IR) light. This signal is modulated at 500 kHz for 10 periods. The probe 100 produces this signal at a known time location in the acoustic output signal as described in the probe description herein above. This allows the microphone board 202 to correlate the time the acoustic signal is produced at the probe 100 with the time light is received by the optical photodiode 622. A photodiode 622 is implemented on the microphone board 202 to receive the light signal. The photodiode 622 has a peak light wave length reception in the IR band. The photodiode wavelength sensitivity is matched to the primary wavelength produced by the emitter 102 in the probe 100. This reduces the signals produced by light sources in the environment. The photodiode 622 converts the light into a current. The amplifier band pass circuit 623 converts the current into a voltage and amplifies the signal to the level required by the demodulator 624. The amplifier band pass circuit 623 consists of a modified version of what those skilled in the art call a photodiode amplifier. This circuit is modified to achieve peak gain at the 500 kHz modulation frequency, with very small gain at DC. If the DC gain where to large then DC environmental sources such as work lamps or sunlight would saturate the first amplifier stage and the circuit would not function. The band pass filter is a second order filter centered at 500 kHz. The amplifier and band pass section remove all signals received by the photodiode 622 not found at the frequency of interest, 500 kHz. This allows this circuit to achieve excellent immunity from light sources in the measurement environment. The output of the amplifier band pass circuit 623 is connected to the demodulator 624. The demodulator 624 consists of 2 parts: 1) a circuit which converts the sinusoidal output of the previous circuit to a square wave to decouple the output from the intensity of the signal received by the photodiode; and 2) an integrating circuit with a 5 period decay and a comparator. The integrator and comparator are designed such that if 5 periods of 500 KHz signal pass through the integrator the level of the output will rise above the comparator threshold resulting in a digital 'ON' output. Additionally, if the output is 'ON' and 5 periods pass without a 500 kHz output, the digital output goes to an 'OFF' state. This circuit is used to filter out spurious impulse events which are received by the photo detector 622 and pass through the amplifier band pass filter 623. The short duration of these events will prevent them from creating a false output from the trigger circuit. In an alternative embodiment, the output of the first stage of the demodulator is directly monitored by a microcontroller, and the function of the second stage is performed in software to achieve greater accuracy in the identification of the time the light is detected. The optical transceiver circuit 620 as a whole can be used as a bidirectional half duplex data interface between microphone boards 202.

In an alternative embodiment, the optical transmitter 102 in the probe 100 is replaced with a transceiver. A data interface is created between the probe 100 and the microphone board 202 using the optical transceivers. This interface replaces the radio interface, allowing elimination of the radio interface. In the optical data interface, data is encoded such that 5 cycles at 500 kHz represents one bit in the active state. When 500 kHz is not present the bus is in the inactive state. The resulting interface is compatible with most half duplex USART type serial communications with a maximum achievable baud rate of 10 kbytes/sec.

In the embodiment of FIG. 6, a wired interface 650 exists on each microphone board 202. This allows the microphone boards 202 to be connected through a wiring harness to a central processing board called the AIM board 203 (see FIG. 2). This interface 650 contains a single DC voltage used to provide power to the microphone board 202, a synchronization interface 651, a shared trigger interface 652, and a serial data interface 653. A single 5V supply voltage and ground return is provided to power the microphone board 202. A power regulation circuit is implemented on the microphone board 202 which regulates the 5V input down to all of the lower voltages necessary to power the microphone board's circuitry.

System level usage of the synchronization and trigger interfaces is discussed in the section below covering the AIM board 203. On the microphone board 202, the trigger interface 652 is connected to digital logic such that a trigger signal from the optical transceiver 620 goes to the microprocessor 630 and out on an outgoing trigger line to the AIM board 203. Incoming trigger signals from the AIM board 203 are logically OR'd with the output of the optical transceiver 620. In this way the microprocessor 630 will trigger ADC conversion of the acoustic receiver 600 based on either an optical trigger or a trigger from the AIM board 203, and trigger signals received by the optical transceiver 620 are passed on to the AIM board 203.

Methods of Operation

The primary purpose of the microphone boards 202 is to receive acoustic energy from the probe 100 and calculate the time of flight of this acoustic energy as it travels from the probe 100 to the microphone board 202.

In one implementation, a sinusoidal 40 kHz acoustic waveform is produced at the probe 100. An optical trigger is produced by the probe 100 at the time the acoustic waveform is produced. Correlation of the optical trigger to the acoustic waveform is discussed in the description of the probe herein above. In this embodiment the ADC in the microprocessor 630 is triggered to sample by the optical trigger (via optical transceiver 620). The ADC then samples data from all three microphones 601 at a continuous period. The largest separation between probe 100 and microphone board 202 specified for this embodiment is 2 m. Knowing the speed of sound in air, one skilled in the art can calculate the maximum time of flight measured by the microphone board 202. The microphone board ADC samples for a duration that is longer than the maximum time of flight.

Accuracy requirements dictate that the time of flight be calculated with an accuracy of 70 ns. This is equivalent to ~1 degree of phase in the 40 kHz signal. Phase instability exists within the received wave form. This instability can be attributed to mechanical properties of the acoustic transmitter, acoustic receiver, and the environment such as air currents, temperature gradients and reflections. In a conventional system, a threshold is applied to the analog voltage from the acoustic receiver to detect the onset of an acoustic wave front. Phase instability in the received waveform exceeds the required accuracy. Hence, in the disclosed system an area of stable phase must be identified and correlated to the output of the probe 100 using the optical trigger. Mathematical algorithms are used to locate the acoustic waveform within the stored data set generated during the ADC sample period. If the waveform is not found, the data set is characterized and an error is sent to the AIM 203. The AIM 203 uses the error information in combination with information from all microphones 601 in the system to determine optimal PGA 602 settings or to identify an error condition such as an obstacle in the environment which prevents the sound from the probe reaching the microphones 601. If a waveform is found and meets a dynamic set of qualifying conditions, phase for each cycle of the waveform is calculated. Algorithms are used to identify an area of stable phase. The portion of the waveform containing stable phase is then correlated to the optical trigger using information provided by the probe 100 about the outgoing waveform. The algorithms for identify the region for phase calculation, for determining phase, and for correlation of the outgoing waveform at the probe to the optical trigger are dynamically selected by the AIM board 203 to compensate for changing environmental conditions. The optimal settings for the PGA circuit 602 are calculated based on the digitized waveform. The time of flight and optimal PGA settings for each microphone 601 are transmitted to the AIM board 203.

The AIM 203 coordinates the generation of acoustic energy at the probe 100 with the start of the ADC sample on the microphone board 202. Additionally, the AIM board 203 configures the sample criteria, such as PGA settings, algorithm selection, waveform selection criteria, and probe characterization, for all microphone boards 202, to match the selected probe 100, preceding each data acquisition cycle. The two transducers in the probe 100 will be acquired independently as selected by the AIM 203.

Acoustic Interface Module (AIM)

Overview

Each beam 200 contains one acoustic interface module (AIM) 203. The purpose of the AIM 203 is to manage the data acquisition system within the disclosed system. The AIM board 203 is the collection point for all of the information within the system, as illustrated in FIG. 2. The AIM board 203 implements a wired power and data interface 650 to the microphone boards 202. The AIM board 203 is also the master of the wireless communication interface used to control the probes 100. The AIM has a data communication interface with a host console 300.

In one embodiment of the system, the AIM board 203 calculates the position of the probes 100 and returns this information to the console 300 for display. The AIM board 203 uses information from the microphone boards 202 to select which microphone data to use in this calculation. The AIM board 203 controls when the probes 100 will emit acoustic energy and manages synchronization between the probes 100 and the microphone boards 202. The AIM also manages data acquisition and synchronization between different microphone boards 202.

In an alternative embodiment of the disclosed system, the AIM board 203 manages the data to the probes 100 and the microphone boards 202, but the host 300 controls the system. In this implementation the AIM 203 passes control information from the host 300 to the probes 100 and microphone boards 202, and returns data from these boards back to the host 300 for processing, diagnostics, and calculation of probe position.

In an embodiment of the disclosed system illustrated in FIG. 7, the AIM board 203 consists of ten individually selectable wired interfaces 700 to the microphone boards 202, a wireless interface 701 to the probes 100, a wired interface 702 to the host 300, and a protected DC power input 703.

The wired interfaces 700 to the microphone boards 202 contain power for the microphone boards 202, a serial data interface, a synchronization interface, and a trigger interface 700a. A 5V dc regulator 704 is used to source power to the microphone boards 202 through the wired interfaces 700. The power return for this supply also provides a ground reference for the digital interfaces which are implemented at a TTL voltage level.

A serial data interface uses the SPI serial communication protocol. This communication is implemented with 2 data signals and 1 clock signal. The network has a master-slave communication structure where the AIM 203 is the master and the microphone boards 202 are the slaves. The SPI interface is implemented in a microprocessor 705 on the AIM board 203. The three SPI data lines together are called a port. One SPI port is utilized on the microprocessor 705 for communication to the microphone boards 202. A programmable logic device called a CPLD 706 is used to connect the single SPI port on the microprocessor 705 to each of the microphone boards 202. A control interface is implemented between the microprocessor 705 and the CPLD 706 such that the microprocessor 705 can select a microphone board 202 for communication. The CPLD 706 provides additional robustness to the system as it provides electro static discharge protection to the communication lines and if one microphone board 202 were to fail, its corresponding port in the CPLD 706 is disabled, leaving the communication interface to the other microphone boards 202 unaffected. In this embodiment, the CPLD 706 implements 10 SPI ports for communication to respective microphone boards 202. Each of these ten SPI ports are connected to a unique connector which also implements power, trigger, and synchronization signals. The position of the microphone board 202 in the system is determined by the AIM microcontroller 705 based on the physical connection of the wired interface. In an alternative configuration, two of these wired connections are connected to remote display boards (not shown). These boards use the same wired interface 650 as the microphone boards 202. The remote display boards are mounted on the outside surface of the beam 200 and are used to display status and diagnostic information for the beam 200 to the user on a display through a graphic interface.

In this embodiment, the trigger and synchronization interfaces are combined. This interface 700a is implemented using two electrical connections where one is driven by AIM 203 under the control of its microprocessor 705 and the other is driven by the microphone board 202. These lines are used to send timing pulse for use in synchronizing events or measuring time base to compensate for timing variations between the microphone boards. A logical OR for all of the incoming lines is implemented in the CPLD 706 such that if a trigger pulse is received by the AIM board 203 from one of the microphone boards 202, this signal is simultaneously output to the AIM microcontroller 705 and all of the other microphone boards 202. All of the microphone boards 202 are observing a single probe 100 during data acquisition and calculating time of flight. Therefore, it is critical for system accuracy that all of the microphone boards 202 share the same trigger signal. Since the trigger lines are interconnected through the CPLD 706, the interconnection is under the control of the microprocessor 705. In an alternative implementation, the trigger is independent for each microphone board 202. In addition, triggers can be shared dynamically if necessary. If the optical receiver on a microphone board 202 is damaged, the trigger from any of the other microphone boards 202 can be passed to it so that the system can still function.

In this embodiment, the manufacturing tolerance on the clock circuit used to derive the time base for data acquired on the microphone boards 202 is not tight enough to meet system accuracy. Creating a system with the required clock circuit tolerance would be cost prohibitive. In order to meet the accuracy requirements of the disclosed system, variations in timing between the microphone boards 202 must be measured and applied as a correction to the time of flight results from the microphone boards 202. This correction insures that all of the microphone results are applied using a single system-wide time base which is critical for system accuracy. In the disclosed implementation the synchronization interface is used to dynamically measure the timing offset corrections. The AIM board 203 sends a pulse of known duration to all of the microphone boards 202 using the synchronization interface. Each of the microphone boards 202 measures the duration of the pulse using the same time base used in the data acquisition system. Each of the microphone boards 202 then returns the measured pulse duration to the AIM board 203. The difference in the measured pulse durations can be used to correct the time of flight calculations to compensate for clocking variations on each of the main boards. In an alternative implementation, the clock used for data acquisition on the microphone board 202 is generated by the AIM microprocessor 705. This clock is then passed to all of the microphone boards 202 through the synchronization interface.

In this embodiment, the AIM board 203 is the master of a wireless communication network used to control the probes 100. The radio interface is implemented using the 802.15.4 wireless communication standard. This interface is used to select which probe 100 is to be sampled. During a typical sampling cycle, a probe 100 is selected, and in a predetermined period of time the probe 100 will send a light pulse and an acoustic pulse sequence. When the probe 100 is selected the AIM board 203 sets up the microphone boards 202 to acquire the acoustic pulse. Information such as such as PGA settings, algorithm selection, and waveform selection criteria are transmitted to the probe 100 preceding each data acquisition cycle. The wireless interface is also used to read calibration and diagnostic data, and status information like battery level from the probes 100. In an alternative implementation, the AIM 203 sends data to the host 300 using the radio interface. The host radio is located in the charger. This eliminates the need for a wired interface to the host 300.

In the embodiment of FIG. 7, the wired interface to the host 300 is an Ethernet 702. This allows off-the-shelf cables to be used between the host 300 and the beam 200. In the disclosed system the Ethernet interface is implemented using an Ethernet switch. This allows the beam to have two Ethernet connections 702a, 702b. The first connection 702a is connected to the host 300. The second Ethernet connection 702b is used to connect a second beam 200 or equipment for upper body measurements (not shown). Since an Ethernet switch is implemented the host 300 has access to both devices.

The power input on the beam 200 is designed to utilize a single DC voltage as input. In this embodiment the power input is designed to accept a range of input voltages. This allows the beam 200 to be compatible with a wide range of off-the-shelf voltage adaptors. These devices convert AC power from electrical outlets to a DC voltage. In an alternative embodiment, the DC voltage to power the beam is sourced by the charger through a custom cable. In this embodiment two power connections are provided on the beam 200. One power connection is to power the beam 200, and the second power connection is provided to pass power on to a second beam 200 or an upper body measurement system.

In this embodiment the AIM 203 manages the firmware for the system. Firmware for the probe 100 and microphone boards 202 is stored in persistent memory on the AIM 203. If a new probe or microphone board is added to the system, the AIM 203 determines if a software update is necessary, and if so reprograms the unit through its communication interface. New firmware for the AIM 203, microphone boards 202, and probes 100 are sent to the AIM 203 from the host 300 for dissemination throughout the system. In this implementation the host 300 is a computer, therefore firmware updates can be distributed to the customer using any physical media typically supported including but not limited to Compact Disc, DVD, Secure Digital, or USB Flash drive. In an alternative implementation, firmware updates are available for download from a secure web sight using an internet browser over an internet connection. In addition to firmware, field and manufacturing calibration for the beam 200 is stored in persistent memory on the AIM 203.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A position measurement apparatus comprising:
a probe including an acoustic signal source, an optical signal source, and a probe processor for driving the signal sources such that the signals of the acoustic source and the optical source have a known temporal relationship to each other;
a receiver for receiving the optical and acoustic signals; and
a processor for communicating with and controlling the probe and the receiver, and processing data from the receiver;
wherein the acoustic signal source is a sinusoidally varying acoustic energy source, and the acoustic signal received by the receiver comprises a sinusoidal signal; and
wherein the processor is for correlating the received sinusoidal signal to a mathematical reference sinusoidal signal, and for determining a specific cycle and a specific phase.

2. The apparatus of claim 1, wherein the processor is for determining the specific cycle and specific phase as a time of flight measurement point based on the correlation.

3. The apparatus of claim 1, wherein the processor is for converting the received sinusoidal signal into digital data, storing the digital data, and processing the digital data.

4. The apparatus of claim 3, wherein the processor is for processing the digital data to compensate for errors in the sinusoidal signal.

5. The apparatus of claim 2, wherein the processor is for instructing the probe processor to drive the optical source such that the reference signal occurs only at the time of flight measurement point.

6. The apparatus of claim 1, wherein the probe and the receiver are for communicating wirelessly with each other.

7. The apparatus of claim 1, wherein the processor includes a controller that is separate from the probe and the receiver, and the controller, the probe and the receiver are for communicating wirelessly with each other.

8. The apparatus of claim 1, wherein the probe includes a battery and a battery charger for providing power to the probe.

9. The apparatus of claim 7, wherein the controller is for coordinating communications between the sensor and the probe, for dynamically instructing the probe processor, and for configuring settings and detection algorithms of the receiver.

10. The apparatus of claim 1, wherein the acoustic signal source is a piezoelectric device, and the receiver includes a microphone for receiving the acoustic signal.

11. The apparatus of claim 2, comprising a plurality of receivers for receiving the optical and acoustic signals;
wherein the processor is for using the specific cycle and specific phase as the time of flight measurement point for the plurality of receivers.

12. A method for position measuring, the method comprising:
providing a probe including an acoustic signal source, an optical signal source, and a probe processor for driving the signal sources such that the signals of the acoustic source and the optical source have a known temporal relationship to each other; and a receiver for receiving the optical and acoustic signals; wherein the acoustic signal source is a sinusoidally varying acoustic energy source, and the acoustic signal received by the receiver comprises a sinusoidal signal;
correlating the received sinusoidal signal to a mathematical reference sinusoidal signal; and
determining a specific cycle and a specific phase.

13. The method of claim 12, comprising determining the specific cycle and specific phase as a time of flight measurement point based on the correlation.

14. The method of claim 12, comprising converting the received sinusoidal signal into digital data, storing the digital data, and processing the digital data.

15. The method of claim 14, comprising processing the digital data to compensate for errors in the sinusoidal signal.

16. The method of claim 13, comprising instructing the probe processor to drive the optical source such that the reference signal occurs only at the time of flight measurement point.

* * * * *